Aug. 13, 1957 A. C. LEOPOLD ET AL 2,802,306
METHOD OF ACCELERATING AND INCREASING FLOWERING
AND FRUITFULNESS IN PLANTS
Filed March 24, 1953
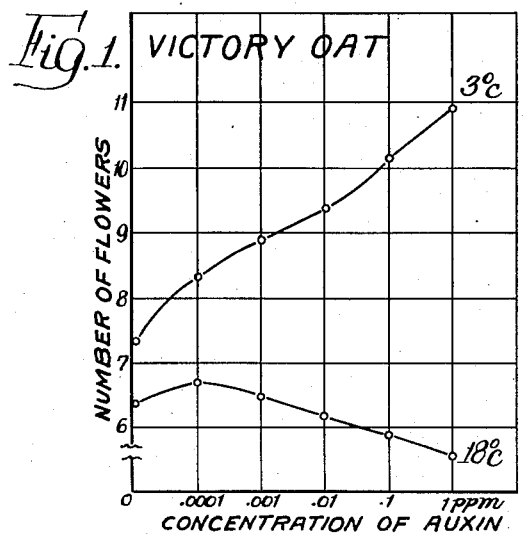
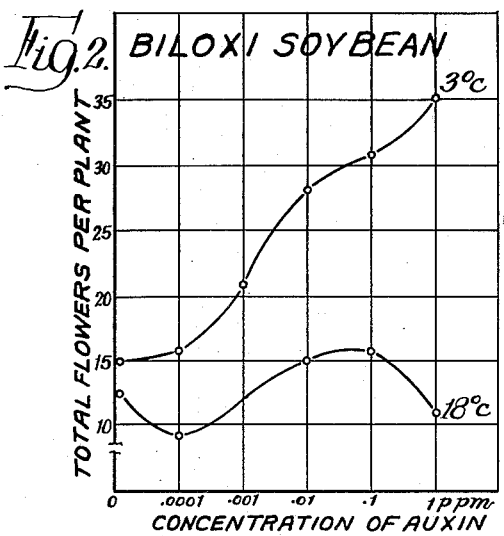
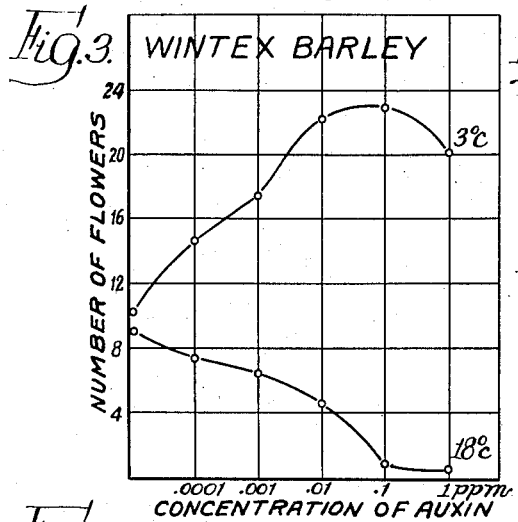
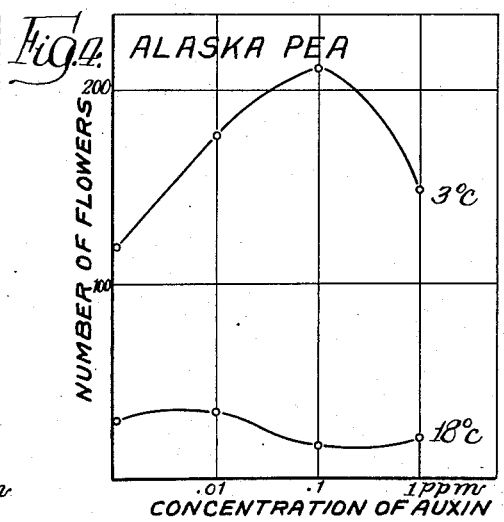
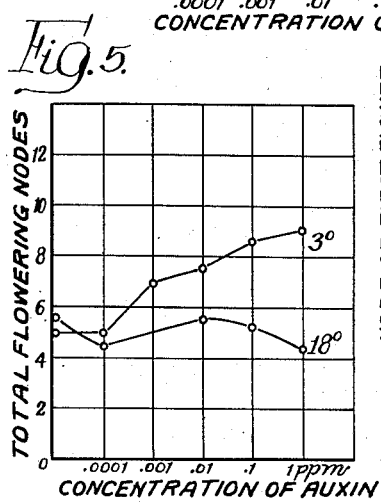
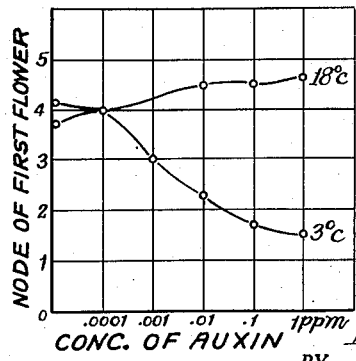
Inventors:
Aldo C. Leopold,
Frances S. Guernsey,
BY
Attys.

United States Patent Office 2,802,306
Patented Aug. 13, 1957

2,802,306

METHOD OF ACCELERATING AND INCREASING FLOWERING AND FRUITFULNESS IN PLANTS

Aldo Carl Leopold, West Lafayette, and Frances Scott Guernsey, Lafayette, Ind., assignors, by mesne assignments, to Research Corporation, New York, N. Y., a corporation of New York Application March 24, 1953, Serial No. 344,284

5 Claims. (Cl. 47—58)

This invention relates to a method of shortening the time to harvest of agricultural crops and to a method of increasing the fruitfulness of plants. More particularly, this invention relates to a method of increasing the earliness and degree of flowering in plants beginning early growth under suboptimal conditions.

It has heretofore been known that a group of compounds known generally as auxins was capable of producing certain various responses in plants. According to the manner and point of application these compounds have, for example, proven capable of inducing greater root growth in plant or cutting, accelerating bud opening, extending the dormant period, and regulating growth in general.

We have now found that the use of such hormone-like substances in treating seeds and the subsequent subjecting of the treated seeds to particular temperature conditions cause more prolific flowering to occur at a point of time in advance of the normal. In a wide variety of plant species we have discovered that the application of auxins in very low concentrations followed by a low temperature treatment of the seeds has encouraged greater flowering and at an earlier point of time than normally would be the case. This increase in flowering and acceleration of flowering occurs in plants being started under suboptimal conditions for early growth such as those conditions existing in winter greenhouses and in early field plantings. A slight modification in the method of application makes the auxin-low temperature treatment likewise applicable to seedlings and more mature plants as will be subsequently discussed in greater detail.

In the drawing:

Figures 1 through 6 are graphs which show the effect on the flowering characteristics of plants when the seeds from which they are grown are treated with auxin solutions of varying concentrations and subsequently stored at the indicated temperatures of 3° C. and 18° C.

For the purposes of this invention auxins include those chemicals which stimulate growth in plants in the manner of the growth hormones. These are aromatic compounds containing an acidic substituent such as naphthalene acetic acid, indole-acetic acid, and all of the active compounds related to 2,4-dichlorophenoxyacetic acid.

In practicing the methods of our invention seeds of diverse types of plants were soaked in solutions of auxin for approximately twenty-four hours at room temperature. After removal from the solution, the seeds were placed in moist vermiculite and transferred to controlled temperature rooms where they remained at temperatures not higher than 10° C. for a substantial period of time varying from species to species some of which begin to respond to as little as five days whereas others do best with as much as twenty-five days. At the end of this temperature treatment they were transplanted into gravel beds in the greenhouse and permitted to develop under photoperiods favorable for flowering. The plants were then dissected under a microscope and the number of flower primordia, their location and stage of development were recorded.

The effect of the above-described process as applied to representative plant species is portrayed in the accompanying charts in which Figs. 1 through 4 show the number of flowers per plant achieved in the case of oats, soybeans, barley, and peas, respectively. As the curves representing the results of 18° C. storage show, mere application of the auxin with the seeds being subsequently maintained at relatively normal temperatures has no effect whereas the enhanced flowering properties possessed by plants growing from seeds subjected to both auxin treatment and low-temperature storage are clearly revealed by the curves marked 3° C.

The Victory Oat comprehended by the data shown in Fig. 1 was selected as a plant species known to be favored in its growth habits by low temperature. Seeds were treated with auxins and temperatures as described and the plants then grown to the age of six weeks at which time they were dissected. As shown, the number of flowers (spikelets) was increased by the auxin treatments followed by low temperature storage. Conversely, the number of flowers was somewhat reduced when the more nearly normal temperature was followed.

Biloxi Soybean was selected as a short-day plant which is known, moreover, to be inhibited in floral initiation by auxin treatment as conventionally practiced. The seeds were treated according to our method, grown to the age of eight weeks, and then dissected. Here again the results as charted in Fig. 2 indicate that the auxin treatments followed by low temperature increased the number of flowers whereas those seeds subjected to the higher temperature exhibited no such characteristic.

Wintex barley was chosen as representative of long-day plants favored in their development by low temperatures. These plants were grown under long photoperiods (18 hours) from the time of transplanting into the greenhouse. After three weeks from the time of germination the plants were dissected and the number of flowers was recorded as shown in Fig. 3. At this relatively early stage of development it can be seen that the various auxin concentrations resulted in a quantitative increase in the number of flowers (spikelets) among those plants which had experienced a low temperature (3° C.) after auxin treatment. In contrast, when plants had experienced a warmer temperature (18° C.) flowering was quantitatively inhibited by the auxin treatment. The number of flowers was increased from approximately ten in the water control to 24 at the 0.1 p. p. m. auxin level followed by 3° C. treatment. At the higher temperature with these same concentrations of auxin, flowering was almost completely eliminated.

Fig. 4, charting the total flowering effect achieved by our technique applied to peas, plots a curve showing the frequency of bloom in Alaska Peas on a given date five weeks after planting. In field grown peas the results obtainable by our pre-planting treatment enables us to bring the crop to condition for harvest about 10 to 14 days before normal.

Sun-up sweet corn seeds were treated with auxins and temperatures described and the plants were grown to an age of seven weeks. Upon dissection it was found that the number of male flowers was consistently increased by the auxin-low temperature treatment. And although the number of female flowers in the first ear was generally decreased, the number of developing ears per plant was found to have been increased by the treatment. The node of first flowers was separately noted for male and female flowers and it was definitely established that both types of flowers were formed at lower nodes following the auxin-low temperature treatments.

Further evidence related to the enhanced flowering effect achieved by our methods is found in Fig. 5 which shows that the total number of flowering nodes—those particular positions on the plant at which flowers develop—was increased considerably with soybeans being representative of the plants tested. Moreover, the node of the first flower is strikingly lowered by the treatments described as pictured in Fig. 6. This latter effect was likewise noticed in other plants treated according to our technique.

The same flowering effect can be produced by treatment of seedlings and even rather mature plants though in such cases the commercial practicability is somewhat diminished by the problems of temperature control particularly with regard to quite mature plants which because of their size cannot be feasibly grown indoors in large numbers. An example of the results attainable in more mature plants is exemplified by results noted in studies made on Biloxi-soybean plants grown to an age of two weeks before being transplanted into controlled temperature rooms. The plants were then subjected to photo-induction periods of five nine-hour days, the plants in one group experiencing a constant temperature of 25° C. ± 2° and the other set being held at 10° C. ± 1°. During photo-induction the clipped leaf tip of the youngest mature leaf of each plant was continuously immersed in a vial containing water or auxin solutions according to recognized methods. At the end of the five-day induction period the plants were all transferred to the greenhouse where they were kept on non-inducing day-lengths of eighteen hours until they were seven weeks old. Dissection at this time showed that the number of flowers was quantitatively reduced by the auxins with 25° C. conditions but quantitatively increased by the auxins and 10° C. conditions. The node of first flower was noted and it was found that flowering occurred at lower nodes after the low temperature conditions at each auxin concentration.

The particular graphs pictured in the accompanying figures were arbitrarily selected as merely representative embodiments illustrative of the results attainable by our technique. In the same vein, no intention to indicate that 1 p. p. m. of the auxin concentration as a critical upper limit is to be inferred. The treatments which have been described utilized aqueous solutions of the chosen auxin with a small amount of a detergent being included to facilitate penetration of the solution. We have found that application of ten parts per million of auxin will generally cause some plant damage. And because there may be some species requiring concentrations higher than those charted, as may very possibly be the situation involving the treatment of the apple, we have used one part per million as an upper, not maximum, limit which would cover the vast majority of plant species.

Illustrative of the favorable modifications in the flowering characteristics of plants that have been observed by us following application of our method are those noted in a wide variety of species including peas, barley, oats, corn, teosinte, wheat, tomatoes, soybeans and crabgrass.

It is thus evident that we have developed a method for altering flowering in plants which will effect as inherent benefits a reduction in the growth period and increase in fruitfulness. Accordingly, what we claim as our invention is:

1. A method of modifying flowering in plants which comprises treating the seed from which said plants are grown in an aqueous auxin solution for approximately twenty-four hours and subsequently subjecting the thus treated seed to temperatures not higher than 10° C. for a period not substantially less than five days.

2. A method of modifying flowering in plants which comprises treating the seed from which said plants are grown in an aqueous auxin solution for approximately twenty-four hours and subsequently subjecting the thus treated seed to temperatures not higher than 10° C. for a period of from about one to about four weeks.

3. A method of modifying flowering in plants according to claim 2 in which the auxin is present in aqueous solution in concentrations from about 0.0001 to about 10 p. p. m.

4. A method of modifying flowering in plants according to claim 2 in which the auxin is present in aqueous solution in concentrations from about 0.0001 to about 1 p. p. m.

5. A method of modifying flowering in plants which comprises treating the seed from which said seed plants are grown with auxin, and subsequently subjecting the thus treated seed to temperatures not higher than 10° C. whereby the earliness and degree of flowering of plants beginning their growth under suboptimal conditions will be increased.

References Cited in the file of this patent

UNITED STATES PATENTS 2,411,359    Billman  --------------- Nov. 19, 1946
2,648,165    Nestor  ---------------- Aug. 11, 1953

OTHER REFERENCES

Avery et al.: "Hormones and Horticulture," published 1947, by McGraw-Hill (N. Y.), pages 186–205.

Curtis et al.: "Introduction to Plant Physiology," published by McGraw-Hill (N. Y.), 1950, pages 565-577.

Van Overbeek: "Agrictultural Application of Growth Regulators . . .," published before Nov. 17, 1952, in Annual Review of Plant Physiology, vol. 3, pages 87–108.